Figure 5:
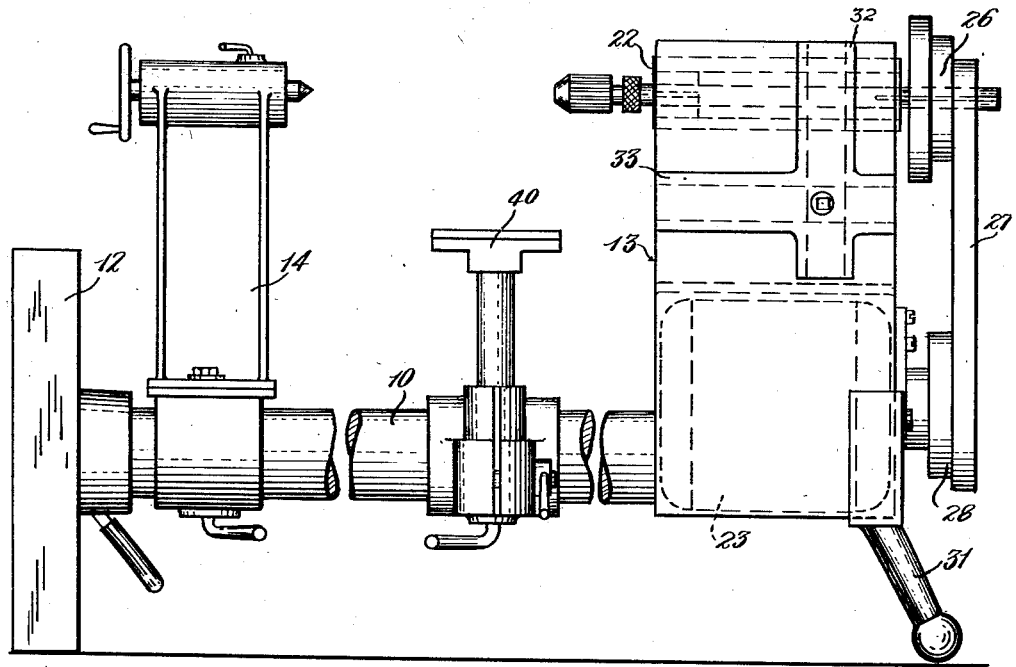

Dec. 5, 1944.    G. H. STAHLER    2,364,396
COMBINATION MACHINE TOOL
Filed April 10, 1942    5 Sheets-Sheet 1
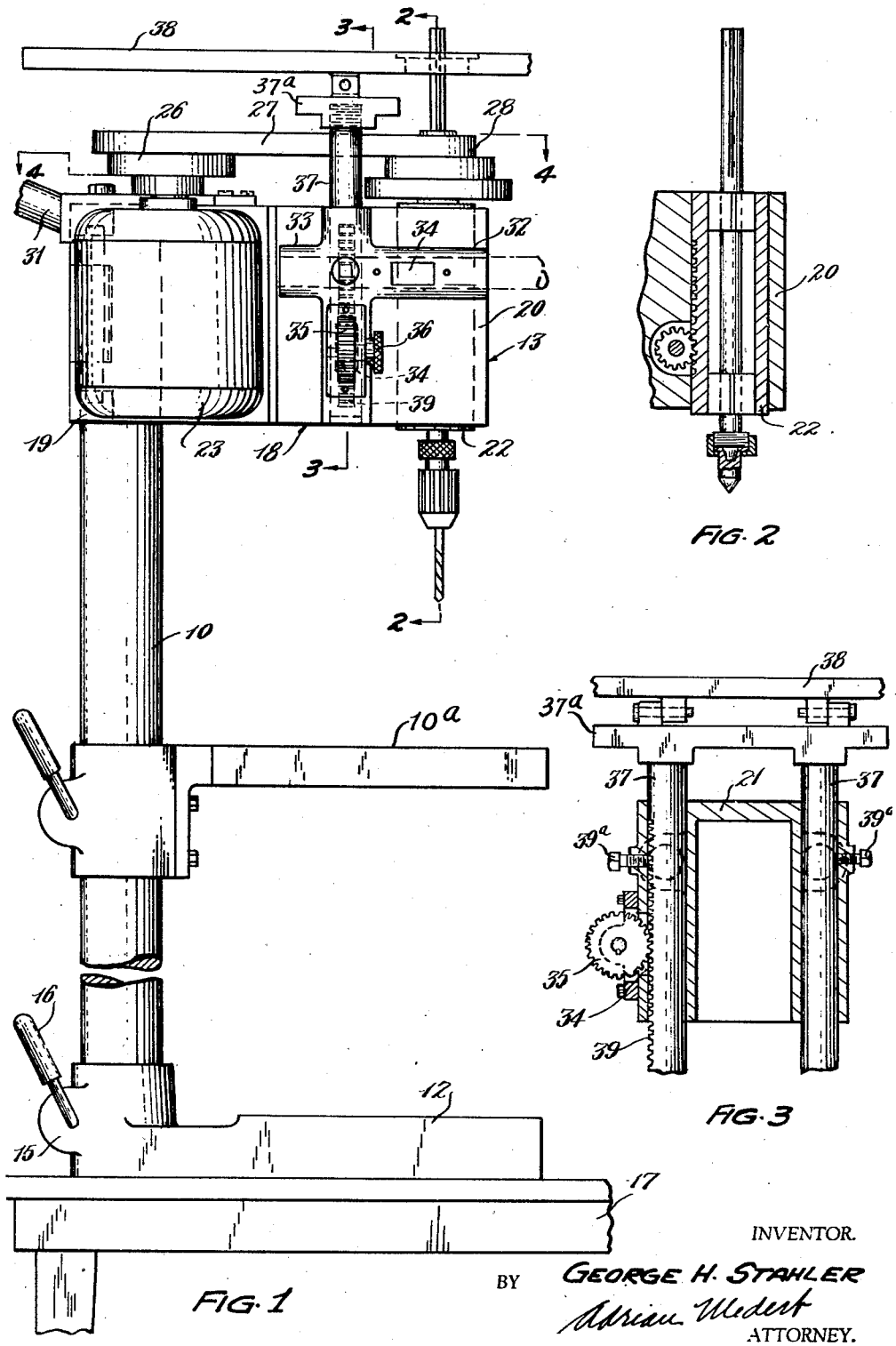
INVENTOR.
GEORGE H. STAHLER
BY Adrian Ulbert
ATTORNEY.

Dec. 5, 1944.　　　　G. H. STAHLER　　　　2,364,396
COMBINATION MACHINE TOOL
Filed April 10, 1942　　　5 Sheets-Sheet 2

INVENTOR.
GEORGE H. STAHLER
BY Adrian Medert
ATTORNEY.

Dec. 5, 1944.  G. H. STAHLER  2,364,396
COMBINATION MACHINE TOOL
Filed April 10, 1942  5 Sheets-Sheet 3

INVENTOR.
GEORGE H. STAHLER
BY
ATTORNEY.

Dec. 5, 1944.   G. H. STAHLER   2,364,396
COMBINATION MACHINE TOOL
Filed April 10, 1942   5 Sheets-Sheet 4
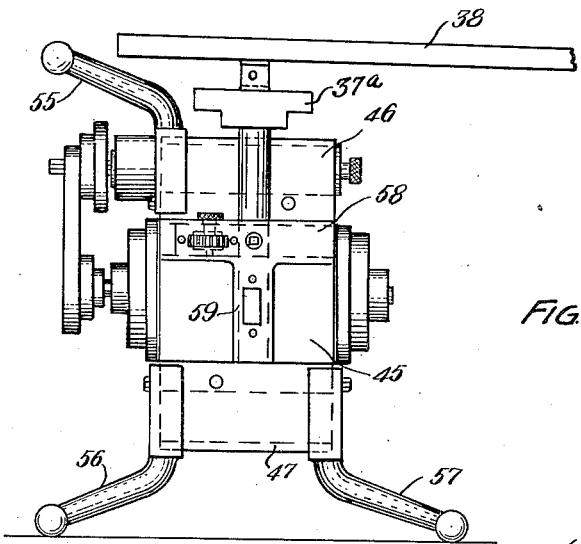
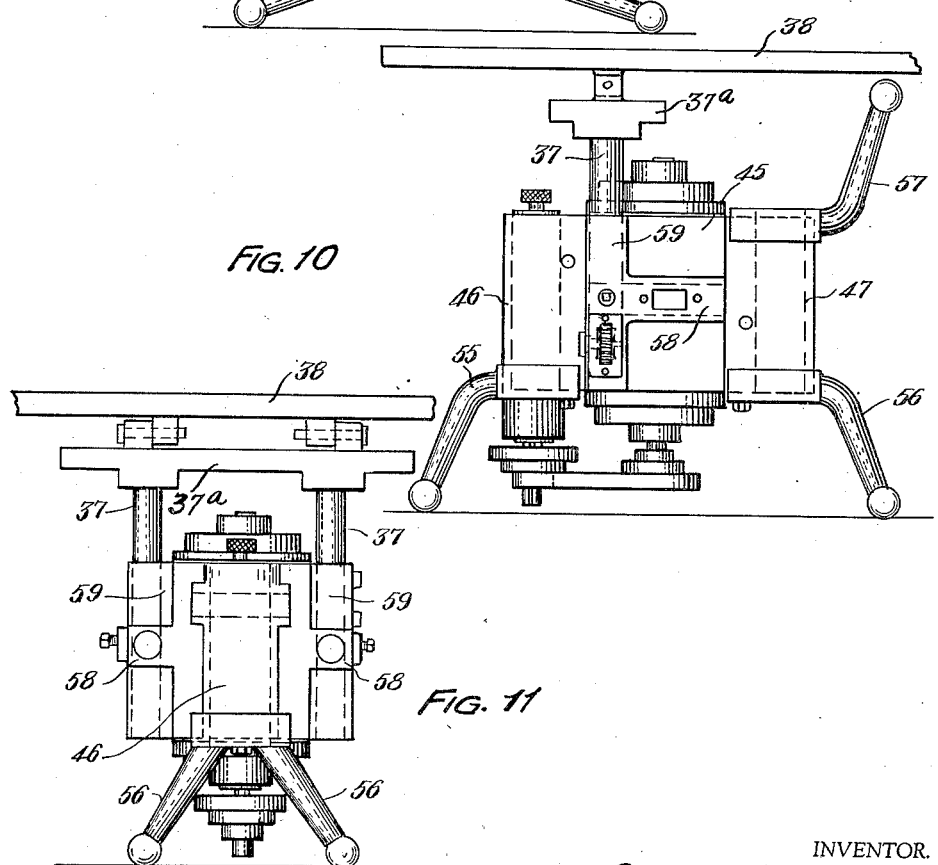
INVENTOR.
GEORGE H. STAHLER
BY
ATTORNEY.

Dec. 5, 1944.    G. H. STAHLER    2,364,396
COMBINATION MACHINE TOOL
Filed April 10, 1942    5 Sheets-Sheet 5

INVENTOR.
GEORGE H. STAHLER
BY
Adrian Medert
ATTORNEY.

Patented Dec. 5, 1944

2,364,396

UNITED STATES PATENT OFFICE 2,364,396

COMBINATION MACHINE TOOL

George H. Stahler, Shaker Heights, Ohio

Application April 10, 1942, Serial No. 438,357

9 Claims. (Cl. 29—27)

This invention relates to a new and improved combination machine tool, and more particularly to a convertible machine tool of the type capable of being quickly and easily converted to adapt it for a plurality of different operations.

It is among the objects of the invention to provide a new and improved combination machine tool of compact and simplified design adapted for use in small home and repair shops which may be readily converted to perform a plurality of different operations such as drilling, sawing, shaping, lathe turning and the like.

A further object of the invention is to provide in a convertible machine tool, a power head including a power driven spindle having appurtenances thereon capable of operatively supporting a work table in either of two positions with respect to the ends of the spindle.

Another object of the invention is to provide in a convertible machine tool a power head having a self contained motor therein.

A still further object of the invention is to provide a simple and compact power head for a machine tool which may be employed as an independent unit to perform certain of the aforementioned operations.

Figures 4, 6:
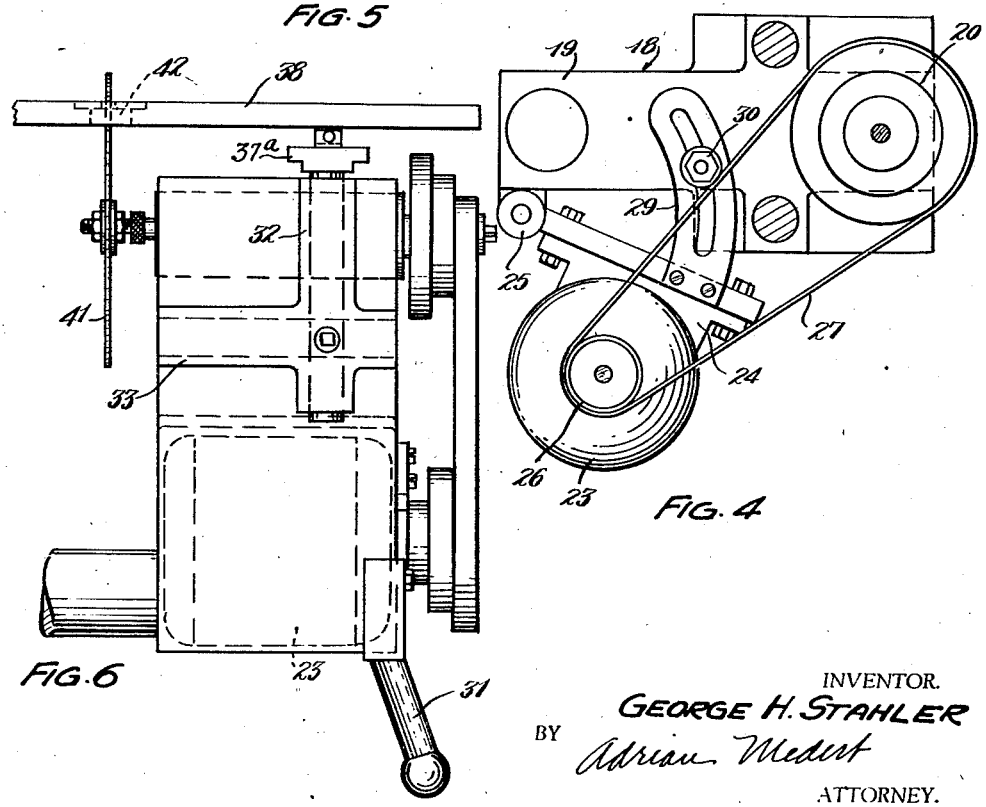
Figure 7:
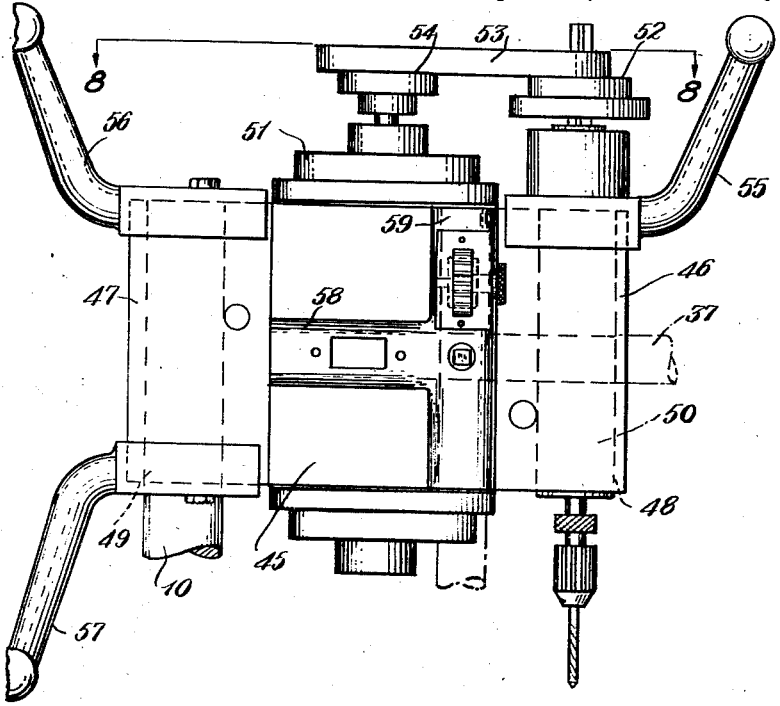
Figure 8:
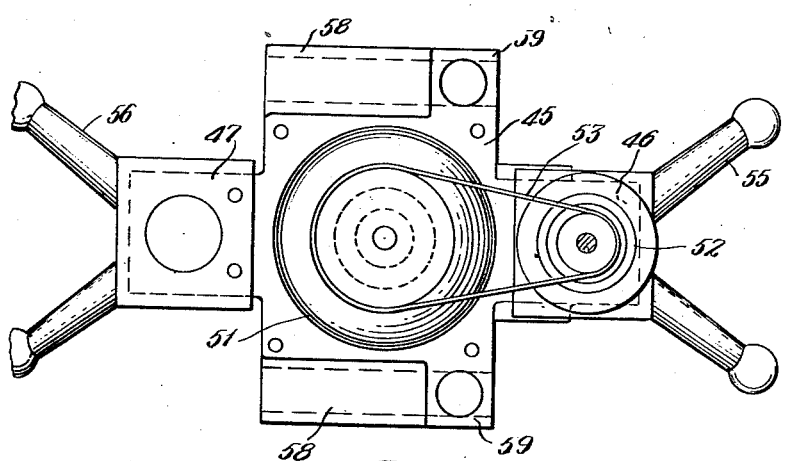
Figure 12:
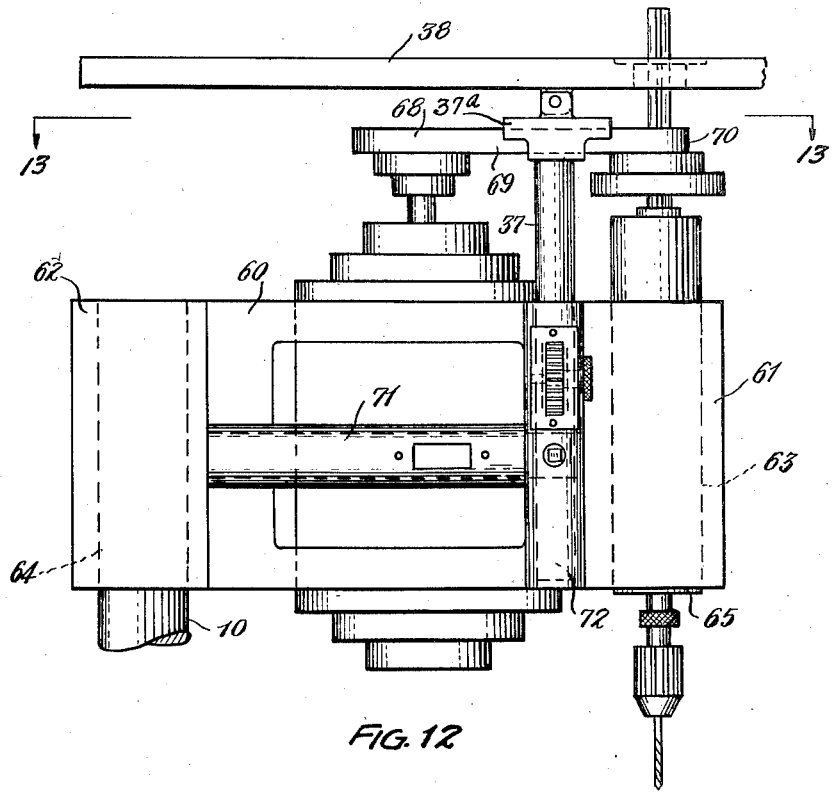
Figure 13:
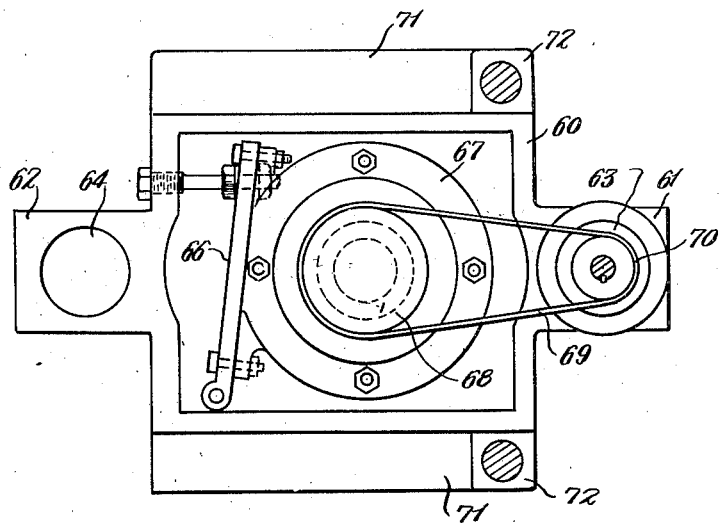

Various additional objects and advantageous features of the invention not at this time more particularly set forth will become apparent and better understood from the following detailed description taken in conjunction with the accompanying drawings, wherein similar reference characters denote corresponding parts, and wherein:

Figure 1 is a side elevational view, with parts thereof broken away, of a convertible machine tool constructed in accordance with the invention, Figure 2 is a fragmentary sectional detail taken on line 2—2 of Figure 1, and illustrating a center point mounted on the spindle replacing the drill chuck shown in Figure 1, Figure 3 is a fragmentary sectional view taken on the line 3—3 of Figure 1, Figure 4 is a plan view partly in section taken on the line 4—4 of Figure 1, Figure 5 is a side elevational view with parts broken away showing the spindle disposed in a horizontal position wherein the device may be employed as a horizontal lathe, Figure 6 is a fragmentary side elevational view of the power head of Figure 5 with a work table operatively disposed thereon, the device being adapted for use as a saw, Figure 7 is a side elevational view of a modified type of power head wherein the elements thereof are integral parts of the motor housing, Figure 8 is a sectional view taken on the line 8—8 of Figure 7, Figures 9, 10 and 11 are elevational views, on a slightly reduced scale, of the power head of Figure 7 disposed in different positions and illustrating its adaptability as an operable integral unit, Figure 12 is a side elevational view of a further modified type of power head, and Figure 13 is a sectional view taken on the line 13—13 of Figure 12.

For purposes of illustration, the invention has been shown as embodied in a convertible machine tool particularly adapted for use in a home workshop, repair shop or the like. With reference to the drawings, particularly Figures 1 to 6 inclusive, the illustrated embodiment of the invention, in general, comprises an elongated column or shaft 10 having a base member 12 disposed at one end and a power head 13 adjacent the other end. As shown in Figure 1, the column 10 being supported in a vertical position, the device serves to perform drilling, milling, shaping and like operations. In Figures 5 and 6 the column 10 is supported in a horizontal position; and with the application of a tail stock 14 to the column, the device may be converted to serve as a lathe as shown in Figure 5, and with the application of a saw blade to the spindle of the power head may be employed as a saw as shown in Figure 6. Thus it will be seen that with very little additional cost there is provided a device capable of a great variety of operations ordinarily had by a series of special machines, such machines being beyond the means of the ordinary workman.

More particularly, the lower end of the column 10 is removably received within the split boss 15 formed on the base member 12. A suitable hand actuated bolt 16 threaded through the split ends of the boss releasably secures the end of the column in adjusted position with respect to the base 12. As shown in Figure 1, the device is arranged to be used as a drill press, the shaft 10 being disposed vertically with a drill table 10a adjustably mounted thereon and the base member 12 resting upon any suitable table or bench 17.

The power head broadly indicated by the numeral 13 comprises a frame or housing member 18 formed with spaced sleeve portions 19 and 20 connected by a web portion 21. The sleeve portion 19 serves to receive the upper end of the column 10 and the sleeve 20 has mounted therein a suitable spindle 22. The ends of the spindle extend beyond the housing 18 and are adapted to receive standard tools and attachments for performing different operations. A motor 23 is mounted in a bracket member 24 pivoted to the housing 18 as at 25 (see Figure 4). Any one of a plurality of pulleys 26 mounted on the armature shaft of the motor 23 may be connected by means of a belt 27 to any one of a plurality of pulleys 28 mounted on the spindle shaft to provide the desired rotative speed consistent with the work being performed. Adjustment of the belt 27 is effected by means of the adjusting arm 29 extending between the housing and bracket 24 which is adapted to be secured in adjusted position by a cap screw 30. Suitable leg members 31 are secured to the housing 18 adjacent the end which receives the column 10.

Mounted on each side of the housing 18 and extending at right angles to each other are integrally formed open ended hollow enlargements 32 and 33 which are provided with suitable openings 34 in which may be mounted a gear 35 adapted to be actuated by means of a hand wheel 36. The parallel enlargements 32 or 33 on opposite sides of the housing 18 are adapted to receive the depending legs 37 of a removable work supporting table 38. The legs 37 are connected together at their upper ends by a cross member 37a to which the top of the table is removably attached. One of the legs 37 is formed with a rack 39 which is engageable with the gear 35. Adjustment of the table relative to the housing 18 and tool mounted on the spindle is effected through the gear 35 and rack 39. Set screws 39a serve to secure the legs of the table in proper adjusted position within the supporting bosses.

The device may be readily converted for use as a shaper by applying a suitable tool to the upper end of the spindle shaft and the positioning of the work supporting table 38 in operative position as shown in Figure 1.

To convert the machine of Figure 1 so as to perform the ordinary functions of a lathe such as turning or spinning, the shaft 10 is supported in a horizontal position as shown in Figure 5. For this purpose the base 12 is rotated through 90° and one side thereof serves as a support for one end of the shaft and the depending leg members 31 secured to the power head 13, serve to support the other end. A tail stock 14 of any suitable design and size capable of cooperating with a suitable chuck mounted on the spindle 22 is applied to the shaft 10. A tool rest 40 is also applied to complete the device for turning operations. While in this position the device may be readily converted for use as a saw. With reference to Figure 6, a suitable saw blade 41 may be applied to the spindle and the work supporting table 38 is applied to the housing as illustrated. In this position the legs 37 of the table are supported within the enlargements 32. The saw blade 41 extends through an adjustable opening 42 in the table which can be raised or lowered by rotation of the gear 35 engaging the rack 39 on the leg of the table to adjust the depth of cut of the saw blade. The table 38 is so constructed that with the application of various types of inserts to the opening 42, the table is readily adapted for use with any desired tool which may be applied to the spindle.

With reference to Figures 7 to 11 inclusive of the drawings, there is illustrated a modified form of power head embodying the invention and comprising a motor housing 45 having outwardly extending portions 46 and 47 integrally formed on opposite sides thereof. The portions 46 and 47 are longitudinally bored to form sleeves 48 and 49, respectively. The sleeve 48 receives the spindle 50, the ends of which extend above and below the housing and are adapted to have suitable tools applied thereto. The spindle 50 is operatively connected to the armature shaft of a motor 51 through pulleys 52, belt 53 and pulleys 54. The sleeve 47 is similarly bored to receive the end of supporting column 10 when the power head is used therewith although it is contemplated that the power head may be used as a self-contained unit for certain operations such as sawing and shaping as shown in Figures 9, 10 and 11. Suitable leg members 55 and 56 and 57 can be applied to the housing for purposes of supporting it in any desired position when it is employed as a separate operating unit. The housing 45 is provided with the right angularly disposed hollow bosses 58 and 59 on each side thereof which are adapted to receive the legs 37 of the removable work supporting table 38.

In Figures 9, 10 and 11 the power head 45 is illustrated removed from the supporting column 10 and supported on the leg members so as to be used as a separate operable unit. In Figure 9 the power head is supported on leg members 56 and 57 with the spindle extending in a horizontal position. With the table 38 supported on the head as shown, a saw blade may be applied to the tool chuck on the end of the spindle and the device adapted to be used as a saw; or with the table removed a grinding wheel can be applied to the spindle and the device used accordingly. In Figures 10 and 11 the power head is supported on the leg members 55 and 56, the spindle thereof extending in a vertical position. The table 38 is supported within the bosses 59 when the power head is supported in this position. A suitable shaping tool then can be applied to the spindle and the device employed for this purpose.

With reference to Figures 12 and 13 of the drawings there is illustrated a still further modified form of power head embodying the present invention. The illustrated embodiment comprises a substantially hollow casting 60 having integrally formed outwardly extending end portions 61 and 62 which are longitudinally bored to provide sleeves 63 and 64 respectively. The sleeve 64 is adapted to receive the end of the supporting shaft or column 10, and sleeve 63 has mounted therein a suitable spindle 65, the shaft of which extends above and below the casting 60. Pivotally mounted within the housing 60 on bracket 66 is a motor 67 having driving connection with spindle 65 through pulleys 68, belt 69 and pulleys 70. The housing 60 is provided with angularly disposed hollow bosses 71 and 72 on each side thereof which are adapted to receive and support the legs 37 of the removable work supporting table 38.

Having thus described my invention what it is desired to obtain by Letters Patent is defined by the appended claims.

I claim:

1. In a device of the class described, a housing, means for supporting said housing in either of two positions, a rotatable work spindle mounted in the housing and adapted to receive tools on the opposite ends thereof, an electric motor mounted on said housing for driving said spindle, a work table having depending legs thereon, and means including hollow enlargements formed on the exterior of said housing for receiving said leg members and supporting the work table in either of two positions with respect to tools mounted on the ends of said spindle, one of said positions being parallel to the axis of the spindle and the other position at right angles thereto.

2. In a device of the class described, a housing member, a rotatable work spindle mounted in said housing member, an electric driving motor carried on said housing for driving said spindle, a belt and pulley transmission for driving the work spindle from the motor, a work table having depending legs thereon, means on said housing for operatively supporting said work table in either of two positions with respect to the ends of said spindle, one of said positions being parallel to the longitudinal axis of the spindle and the other position at right angles thereto, said means including hollow enlargements on said housing arranged in pairs extending at right angles to each other.

3. In a device of the class described, a housing member, a rotatable work spindle mounted in said housing member, an electric driving motor carried on said housing for driving said spindle, a belt and pulley transmission for driving the work spindle from the motor, a work table, and means including hollow enlargements formed on said housing for operatively supporting said work table in either of two positions with respect to the ends of said spindle, one of said positions being parallel to the axis of the spindle and the other position at right angles thereto.

4. In a device of the class described an elongated shaft member, a motor housing supported on one end of said shaft and having leg members connected thereto, an enlarged base member rotatably mounted on the other end of said shaft for supporting the shaft in a vertical position whereby said shaft may be shifted from a vertical position to a horizontal position, the said base member being rotated through 90° to cooperate with said leg members to support the shaft in a horizontal position, a power driven spindle mounted in said motor housing, and means carried by said housing for operatively supporting a work table in either of two positions 90° apart with respect to the axis of the spindle.

5. In a device of the class described, an elongated shaft member, means for supporting said shaft in either of two positions, a motor housing having a sleeve formed therein adapted to receive the end of said shaft member, a second sleeve in said housing having a power driven spindle mounted therein and means carried by said motor housing for supporting a work table in either of two positions with respect to said spindle, said means including hollow enlargements on said housing arranged in pairs extending at right angles to each other.

6. In a device of the class described, an elongated supporting shaft, means for supporting said shaft in either of two positions, a motor housing having a sleeve formed therein serving to receive one end of said shaft, a second sleeve in said housing having a rotatable work spindle mounted therein, an electric driving motor mounted in said housing intermediate said sleeves, a belt and pulley transmission for driving the work spindle from the motor, a work table, and means carried by said frame member for operatively supporting said work table in either of two positions 90° apart with respect to said spindle.

7. In a device of the class described an elongated supporting shaft, means for supporting said shaft member in either of two positions, a frame member having spaced sleeves, one of said sleeves adapted to receive the end of said shaft and the other sleeve having a rotatable spindle mounted therein, an electric driving motor mounted on said frame member, a belt and pulley transmission for driving the work spindle from the motor, a work table, and means carried by said frame member for operatively supporting said work table in either of two positions 90° apart with respect to the ends of said spindle.

8. In a device of the class described, a housing having spaced parallel sleeves extending therethrough, one of said sleeves having a rotatable spindle mounted therein and the other sleeve serving to receive one end of a supporting member, a motor mounted within the frame between said sleeves having a driving connection with said spindle, and means including hollow enlargements on said housing for operatively supporting a work table in either of two positions with respect to the ends of said spindle.

9. In a device of the class described, a housing having spaced parallel sleeves extending therethrough, means for supporting said housing in either of two positions, one of said sleeves having a rotatable spindle mounted therein and the other sleeve serving to receive one end of a supporting member, a motor mounted within the frame between said sleeves having a driving connection with said spindle, a work table for operatively supporting work with respect to tools mounted on the ends of said spindle, and means including hollow enlargements on the exterior of said housing for adjustably supporting the work table in either of two positions 90° apart.

GEORGE H. STAHLER.